United States Patent
Nguyen et al.

(10) Patent No.: US 8,188,432 B1
(45) Date of Patent: May 29, 2012

(54) INFRARED CAMERA PACKAGING AND ALIGNMENT SYSTEMS AND METHODS

(75) Inventors: Vu L. Nguyen, Goleta, CA (US); Theodore R. Hoelter, Santa Barbara, CA (US); Marcel Tremblay, Goleta, CA (US); Farhad Mirbod, Santa Barbara, CA (US)

(73) Assignee: Flir Systems, Inc., Wilsonville, OR (US)

( * ) Notice: Subject to any disclaimer, the term of this patent is extended or adjusted under 35 U.S.C. 154(b) by 780 days.

(21) Appl. No.: 12/348,683

(22) Filed: Jan. 5, 2009

(51) Int. Cl.
*H04N 5/33* (2006.01)
(52) U.S. Cl. ............... 250/338.1; 250/347; 250/353
(58) Field of Classification Search ............ 250/338.1, 250/347, 353
See application file for complete search history.

(56) References Cited

U.S. PATENT DOCUMENTS

| | | | | |
|---|---|---|---|---|
| 6,326,611 | B1 * | 12/2001 | Kennedy et al. | 250/239 |
| 6,377,300 | B1 * | 4/2002 | Morris et al. | 348/207.99 |
| 7,402,802 | B1 * | 7/2008 | Terre et al. | 250/330 |
| 2002/0162963 | A1 * | 11/2002 | Lannestedt et al. | 250/351 |
| 2006/0016995 | A1 * | 1/2006 | Kummer et al. | 250/338.1 |

* cited by examiner

*Primary Examiner* — David Porta
*Assistant Examiner* — Djura Malevic
(74) *Attorney, Agent, or Firm* — Haynes and Boone, LLP

(57) ABSTRACT

One or more embodiments of the invention provide for a lens package comprising a housing having a vacuum compatible interior space, a base coupled to the housing, a lens coupled to the housing, and an infrared detector within the housing for providing infrared images representative of infrared energy received through the lens. The housing, base, and lens are adapted to form an infrared detector vacuum package assembly. The housing may include a focal alignment feature that allows for focal adjustment of the lens relative to the infrared detector by applying pressure to at least a portion of the housing.

25 Claims, 18 Drawing Sheets

INFRARED CAMERA PACKAGING AND ALIGNMENT SYSTEMS AND METHODS

TECHNICAL FIELD

The invention relates generally to infrared imaging systems, such as an infrared camera, and more particularly to packaging and alignment of components for infrared imaging systems.

BACKGROUND

Infrared cameras are utilized in a variety of imaging applications to capture infrared images. A conventional infrared camera typically includes an infrared detector within a vacuum package assembly that provides an infrared-transparent window through which the infrared detector receives infrared energy. The vacuum package assembly, during the manufacturing process for the infrared camera, generally is aligned with a lens to focus the infrared energy onto the infrared detector.

A potential drawback of a conventional infrared camera is that the proper alignment of the lens to the infrared detector within the vacuum package assembly may represent a time-consuming and complex step during the design and/or manufacturing process of the infrared camera and thus, may add significantly to the overall manufacturing costs of the infrared camera. Another potential drawback is that the infrared-transparent window may add to the manufacturing costs and also may diminish overall infrared transmission to the infrared detector.

As such, there currently exists a need to provide improved techniques directed to infrared cameras, such as for example for packaging and alignment of infrared camera components during the manufacturing process.

SUMMARY

In accordance with one or more embodiments of the invention, systems and methods disclosed herein provide for a vacuum package assembly, also referred to herein as a lens package, comprising a housing component having a vacuum compatible interior space, a base component attached to the housing component, a lens component attached to an interior portion of the housing component, and a detector component for capturing infrared image signals representative of infrared energy from an image passing through the lens component. The housing component comprises a focal alignment feature that allows focal adjustment of the lens component by applying pressure to a portion of the housing component.

In some implementations, the housing component comprises a cylindrically-shaped metal structure that is adapted to define the vacuum compatible interior space. The base component comprises a circular-shaped disk type structure comprising a ceramic material and/or a metal material, and wherein the base component is attached to the housing component with a solder or adhesive element. The lens component comprises a lens element or group of lens elements that are integrated with the housing component and adapted to focus infrared energy received from an image to the detector component positioned within an interior or external space of the housing component, and wherein the lens element is attached or coupled to the housing component with a second solder or adhesive element. The base component comprises one or more pins or pads that provide electrical access to electrical outputs of the detector component, and wherein the pins or pads are formed of a conductive material including metal. The detector component comprises at least one infrared sensor for providing infrared image signals representative of infrared energy received from an image passing through the lens component.

In some implementations, the focal alignment feature allows for deformation of the housing structure to thereby provide for focal adjustment of the lens component in at least one direction. In another implementation, focal adjustment of the lens component provides an adjustable focus range between the lens component and the detector component with directional focusing capability by compression of the focal alignment feature.

In one implementation, the housing component comprises a top portion with the focal alignment feature that allows focal adjustment of the lens component by applying pressure to the top portion. In one aspect, a compression force may be applied to the top portion of the housing component in a first direction to move the lens component, which is attached to an interior surface of the top portion, in the first direction towards the detector component.

In another implementation, the housing component comprises a top portion with a focal alignment feature formed around a circumference of the top portion. In one aspect, the focal alignment feature allows focal adjustment of the lens component by applying pressure to the circumference of the top portion. In another aspect, a compression force is applied to the top portion of the housing component in a first direction perpendicular to the base component to move the lens component, which is attached to an interior surface of the top portion, in the first direction towards the detector component.

In another implementation, the housing component comprises a plurality of bellows as a compression or decompression alignment feature to allow for focal adjustment of the lens component by applying pressure to the plurality of bellows or relieving pressure from the plurality of bellows, respectively. The bellows are adapted to be integrated compressible or decompressible spring features positioned on a side portion of the housing component for focally adjusting the lens component, which is attached to an interior surface of a top portion of the housing component. In one aspect, a compression pressure is applied to a top portion of the housing component in a first direction to compress the bellows and move the lens component, which is attached to an interior surface of the top portion, in the first direction towards the detector component. In another aspect, a decompression pressure is applied to a top portion of the housing component in a second direction, opposite to the first direction, to decompress the bellows and move the lens component, which is attached to an interior surface of the top portion, in the second direction away from the detector component.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

In accordance with one or more embodiments of the invention, systems and methods disclosed herein provide for infrared camera packaging and alignment techniques. For example, various techniques are disclosed for packaging infrared components and for providing focal alignment of vacuum package assembly components (e.g., lens package components) for infrared camera systems (e.g., any type of infrared imaging system).

As noted previously, a conventional vacuum package assembly for an infrared (IR) camera includes an IR detector and an IR-transparent window, with the vacuum package assembly generally requiring alignment with a lens for the IR camera, which may add cost and complexity to the manufacturing process. In contrast for one or more embodiments, an integrated lens is provided within a vacuum package assembly to eliminate the need for an additional vacuum package window and associated components, which may provide certain benefits, such as an increase in vacuum space for longer vacuum life, provide a more compact lens/detector packaging, provides reduced and/or no optical transmission loss due to an additional window, and/or provide direct and improved thermal coupling between detector, lens structure, and lens element for improved image quality. In accordance with some embodiments of the invention, systems and methods disclosed herein provide for directional alignment and focus of a lens element relative to the IR detector in vacuum space and provide for retaining the lens assembly in place after focal alignment.

Figure 1A:
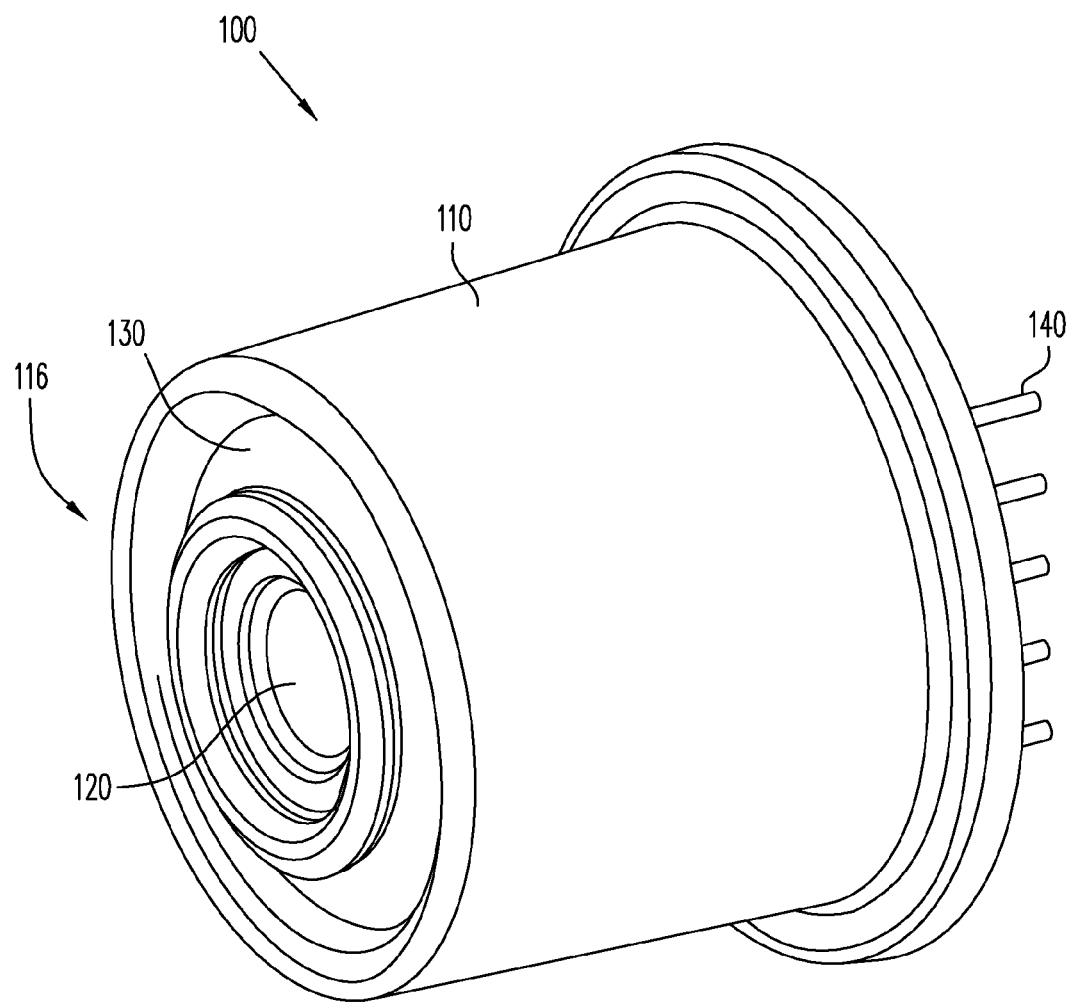
FIGS. 1A-1C show a vacuum package assembly (e.g., a lens package) with a focal alignment feature, in accordance with an embodiment of the invention.
Figure 1B:
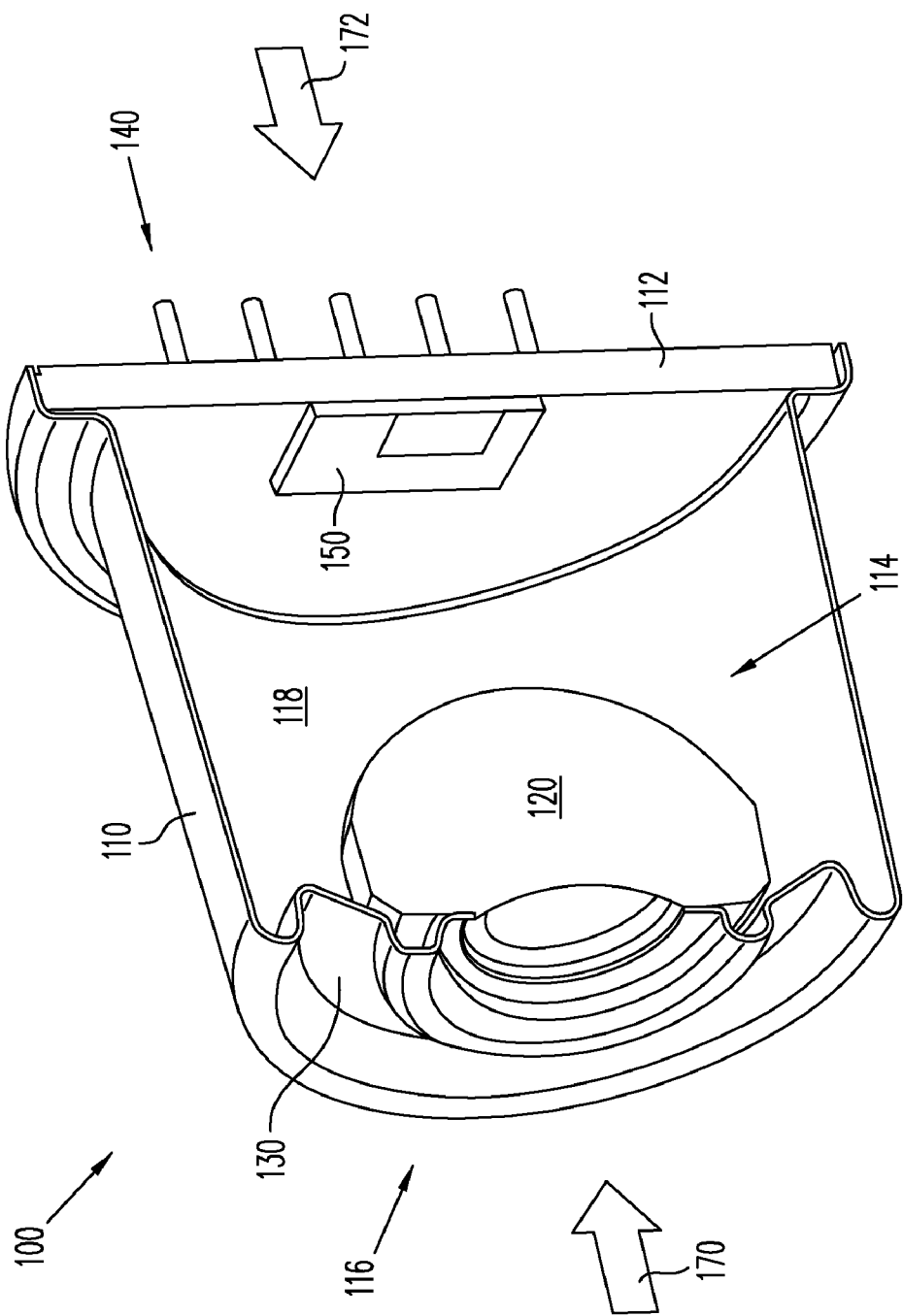
Figure 1C:
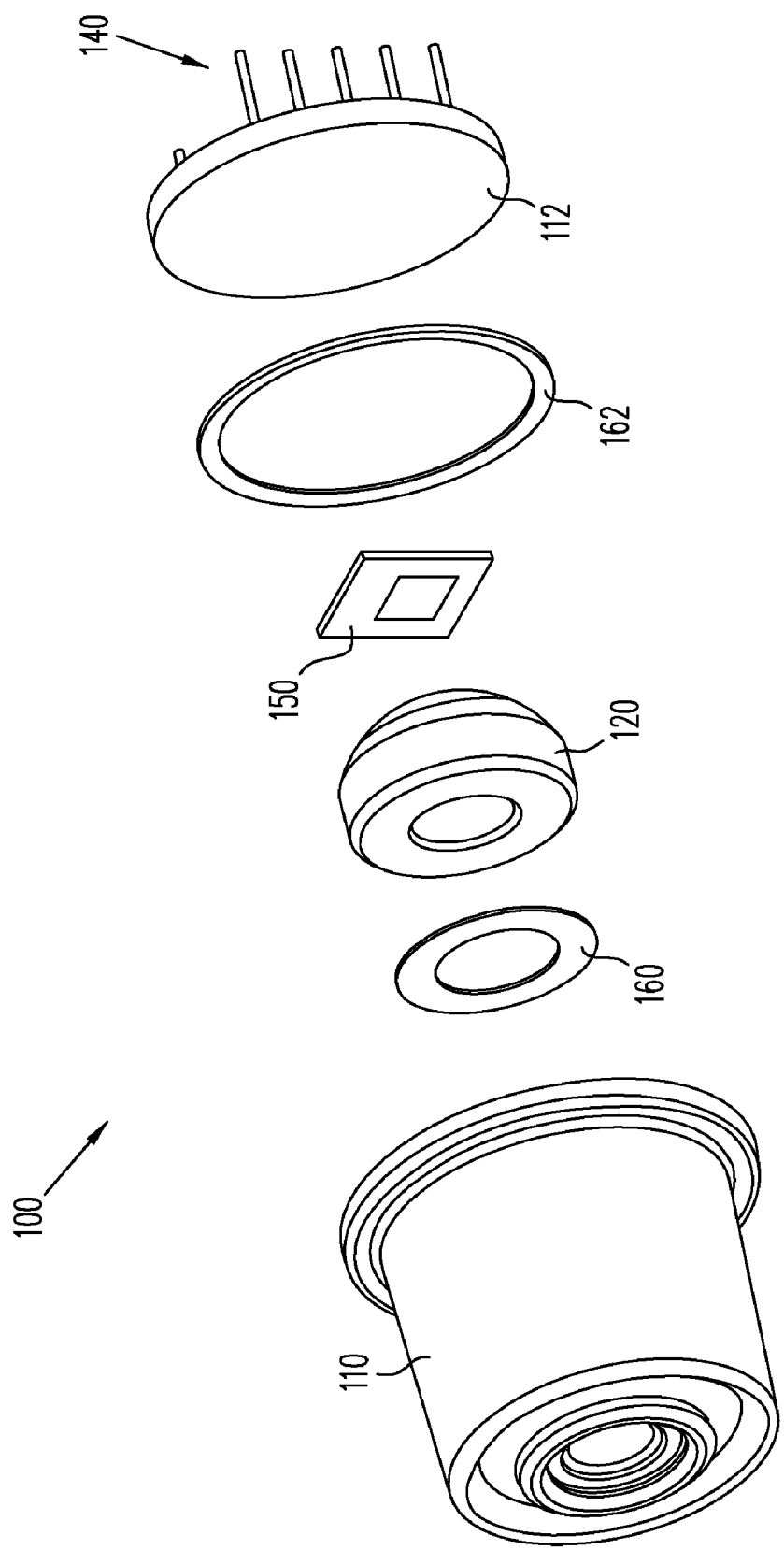

FIGS. 1A-1C show various perspective views of a lens package 100, in accordance with an embodiment of the invention. In particular, FIG. 1A shows one embodiment of an assembled view of the lens package 100, FIG. 1B shows one embodiment of a cross-sectional view of the lens package 100, and FIG. 1C shows one embodiment of an expanded view of the lens package 100.

The lens package 100, in one embodiment, comprises a housing component 110, a base component 112, a lens component 120, and a detector component 150. The housing component 110 comprises, in one embodiment, a metal structure that is adapted to be vacuum compatible with high thermal conductivity. The housing component 110 comprises a cylindrically-shaped structure that defines an interior space 114, which may maintain a vacuum when attached to the base component 112 and the lens component 120, as would be understood by one skilled in the art and/or as discussed further herein by example. In one implementation, the housing component 110 comprises an interior surface 118, which may be optionally coated with an IR, non-reflective material (e.g., black paint).

The base component 112 comprises, in one embodiment, a circular-shaped disk type structure comprising a ceramic material and/or a metal material. Referring to FIG. 1C, the base component 112 may be attached to the housing component 110 with a solder or adhesive element 162. In one aspect, the base component 112 may be utilized to provide support to the housing component 110 during adjustment of the focal position of the lens component 120, which is described in greater detail herein.

The lens component 120, in one embodiment, comprises a lens element or group of lens elements that are integrated with the housing component 110 and adapted to focus IR energy from an object (e.g., an image or scene) to the detector component 150 (e.g., IR detector) positioned within the interior space 114 of the housing component 110. Referring to FIGS. 1B and 1C, the lens element 120 may be attached to an interior portion of the housing component 110 with a solder or adhesive element 160.

In an alternative implementation (for this and other embodiments discussed herein), as would be understood by one skilled in the art, the lens element 120 may be attached or coupled to an exterior portion of the housing component 110 with a solder or adhesive element. For example, the lens component or lens element 120 forming a portion of the vacuum package assembly may be adapted to be mounted (or coupled) to an exterior portion of housing component 110 (e.g., as similarly shown for the interior portion, such as with a radial flange and/or with solder, adhesive, or similar securing techniques).

Figure 1D:
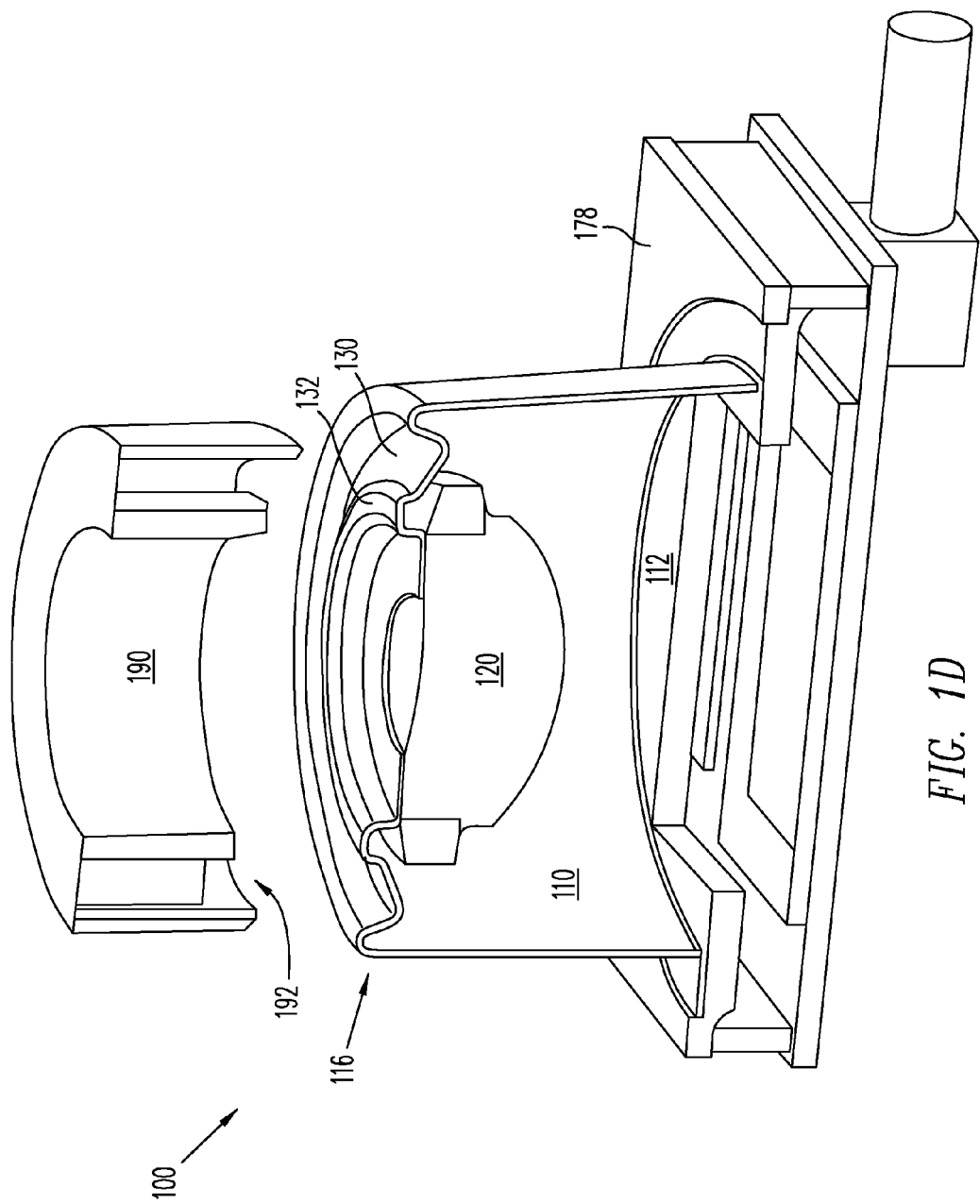
FIG. 1D shows a cross-sectional view of the vacuum package assembly (e.g., lens package) of FIGS. 1A-1C and a compression tool for focal adjustment of the focal alignment feature, in accordance with an embodiment of the invention.

The housing component 110, in one embodiment, comprises a top portion 116 with a focal alignment feature 130 that allows focal adjustment of the lens component 120 by applying pressure (e.g., forcefully compressing) to the top portion 116 (e.g., as illustrated in FIG. 1D and discussed further herein). In one aspect, the focal alignment feature 130 may be referred to as a built-in compressible spring feature for focally adjusting the top portion 116 (i.e., top wall portion) of the housing component 110. For example, as shown in FIG. 1B, a compression force 170 may be applied to the top portion 116 of the housing component 110 in a first direction perpendicular to the base component 112 to move the lens component 120, which is attached to the interior surface of the top portion 116, in the first direction towards the detector component 150. A corresponding force 172 may be applied to the base component 112 in a second direction, which is opposite to the first direction, to provide support to the housing component 110 during compression of the top portion 116. As such, in one aspect, this allows for focal adjustment of the lens component 120 in reference to the detector component 150 to thereby provide an adjustable focus range between the lens component 120 and the detector component 150 with directional focusing capability by compression of the focal alignment feature 130 of the housing component 110.

The base component 112 comprises one or more pins or pads 140 that provide electrical access to electrical outputs of the detector component 150. The pins or pads 140 are formed of a conductive material, such as metal.

The detector component 150 comprises, in one embodiment, at least one infrared sensor (e.g., any type of infrared sensor, such as a focal plane array) for capturing infrared image signals representative of IR energy from an object passing through the lens component 120. In one aspect, the infrared sensor of detector 150 provides for representing (e.g., converting) a captured image signal of an image as digital data (e.g., via an analog-to-digital converter included, for example, as part of the detector component 150). In another aspect, a processing component (not shown) may be coupled to the detector component 150 via the pins 140 and be adapted to receive infrared image signals from the detector component 150, process infrared image signals (e.g., to provide processed image data), and store infrared image signals or image data in a memory component (not shown).

Referring to FIGS. 1A-1C, the lens package 100 provides for deformation of the top portion 116 of the housing component 110 via the focal alignment feature 130, which allows for focal adjustment of the lens component 120 in at least one direction. In one aspect, the focal adjustment or deformation of the metal housing structure (i.e., housing component 110) may be permanent and substantially reliable. Accordingly, the lens package 100 provides for an adjustable focus range with directional focusing capability by compression.

FIG. 1D shows one embodiment of a cross-sectional view of the lens package 100 and a compression tool 190 (e.g., an alignment tool) that may be used to couple with the focal alignment feature 130 to allow focal adjustment of the lens component 120 by applying pressure (e.g., forcefully compressing) to the top portion 116 of the housing component 110. As shown in FIG. 1D, the compression tool 190 comprises a coupling feature 192 that is adapted to couple with a ridged portion 132 of the focal alignment feature 130. FIG. 1D also shows a platform 178 that is adapted to receive the base component 112 and a portion of the housing component 110 so as to support the lens package 100 during compression thereof.

In one aspect, when pressure is applied (e.g., with a press or other conventional technique) to the compression tool 190 in a manner as described herein (e.g., in reference to FIG. 1B), the compression tool 190 transfers the applied pressure to the focal alignment feature 130 to compress the focal alignment feature 130 towards the detector component 150, which is coupled to the base component 112. For example, as described in reference to FIG. 1B, a compression force (e.g., via the compression tool 190) may be applied to the focal alignment feature 130 to move the lens component 120 towards the detector component 150 to focally adjust the lens component 120 relative to the detector component 150 (e.g., precisely align lens component 120 to detector component 150). This additional focal alignment process may be required, for example, to fine tune the focal distance between the lens component 120 relative to the detector component 150 (e.g., provide fine tuning beyond which manufacturing capabilities of the housing component 110 and associated components may provide).

Figure 1E:
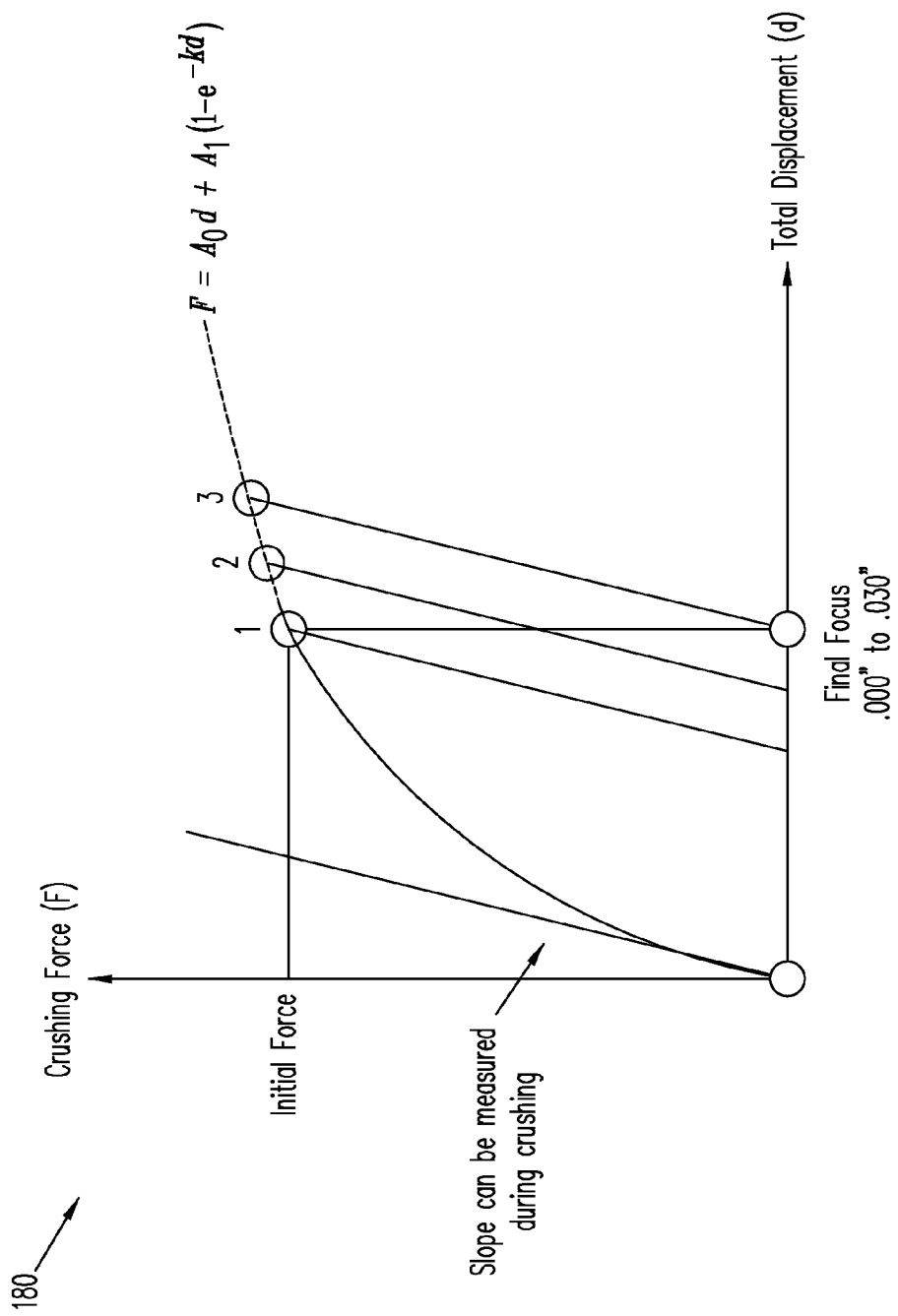
FIG. 1E graphically illustrates displacement due to progressive compression of the vacuum package assembly (e.g., lens package) of FIGS. 1A-1C during focal adjustment of the focal alignment feature, in accordance with an embodiment of the invention.

FIG. 1E illustrates a graph 180 of a progressive compression of the lens assembly 100 during focal adjustment of the lens component 120 relative to the detector component 150. The graph 180 shows a total displacement (d) as a function of a compression force (F), wherein $F=A_0 d + A_1(1-e^{-kd})$. In one aspect, referring to FIG. 1E, the function provides for the elasticity of the focal alignment feature 130, wherein the final focus displacement may be achieved by over compressing the focal alignment feature 130 (e.g., to point 2 or 3) and calculating for an elastic displacement (i.e., "bounce back") to achieve the final focus displacement (e.g., at point 1), as would be understood by one skilled in the art.

Figure 2A:
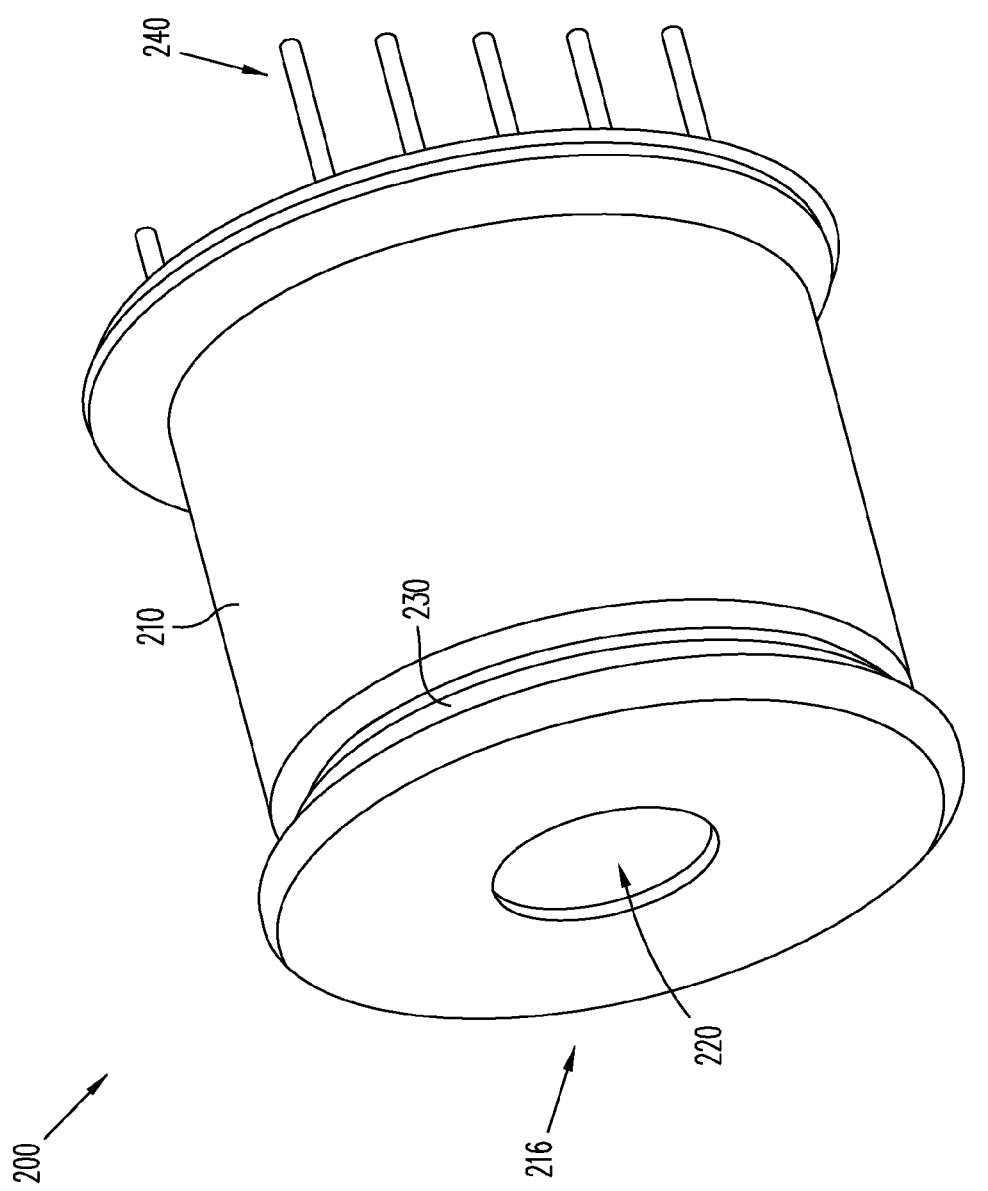
FIGS. 2A-2C show another vacuum package assembly (e.g., lens package) with another focal alignment feature, in accordance with another embodiment of the invention.
Figure 2B:
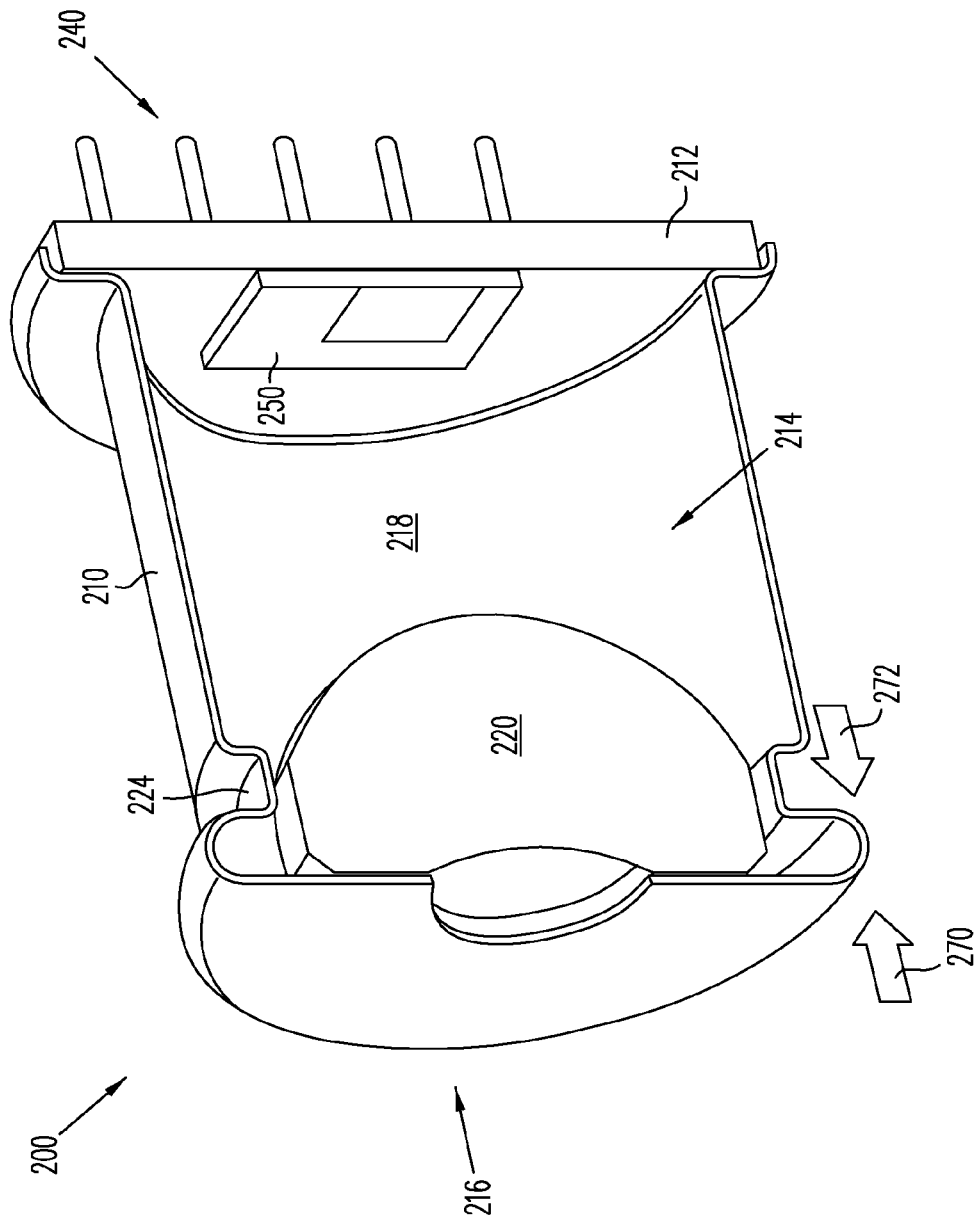
Figure 2C:
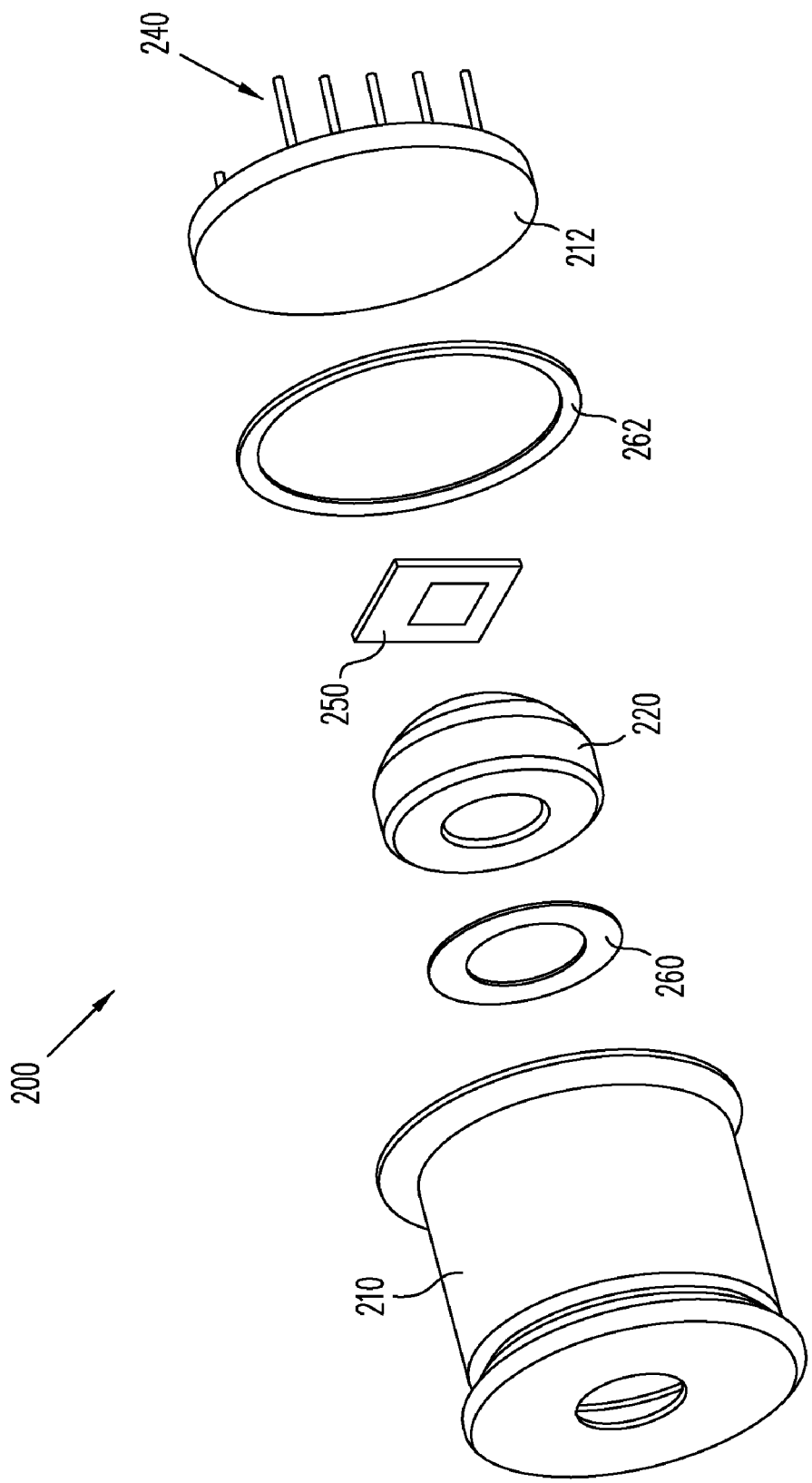

FIGS. 2A-2C show various perspective views of a lens package 200, in accordance with another embodiment of the invention. In particular, FIG. 2A shows one embodiment of an assembled view of the lens package 200, FIG. 2B shows one embodiment of a cross-sectional view of the lens package 200, and FIG. 2C shows one embodiment of an expanded view of the lens package 200.

The lens package 200, in one embodiment, comprises a housing component 210, a base component 212, a lens component 220, and a detector component 250. The housing component 210 comprises, in one embodiment, a metal structure that is adapted to be vacuum compatible with high thermal conductivity. The housing component 210 comprises a cylindrically-shaped structure that defines an interior space 214, which may maintain a vacuum when attached to the base component 212 and lens component 220. In one implementation, the housing component 210 comprises an interior surface 218, which may be optionally coated with an IR, non-reflective material (e.g., black paint).

The base component 212 comprises, in one embodiment, a circular-shaped disk type structure comprising a ceramic material and/or a metal material. Referring to FIG. 2C, the base component 212 may be attached to the housing component with a solder or adhesive element 262. In one aspect, the base component 212 may be utilized to provide support to the housing component 210 during adjustment of the focal position of the lens component 220, which is described in greater detail herein.

The lens component 220, in one embodiment, comprises a lens element or group of lens elements that are integrated with the housing component 210 and adapted to focus IR energy from an object to the detector component 250 positioned within the interior space 214 of the housing component 210. Referring to FIGS. 2B and 2C, the lens element 220 may be attached to an interior portion of the housing component 210 with a solder or adhesive element 260.

The housing component 210, in one embodiment, comprises a top portion 216 with a focal alignment feature 230 formed around a circumference of the top portion 216. In one aspect, the focal alignment feature 230 allows focal adjustment of the lens component 220 by applying pressure (e.g., forcefully compressing or pinching) to the circumference of the top portion 216. The focal alignment feature 230 may be referred to as a built-in compressible spring feature for focally adjusting the top portion 216 (i.e., top wall portion) of the housing component 210. For example, as shown in FIG. 2B, a compression force 270 may be applied to the top portion 216 of the housing component 210 in a first direction perpendicular to the base component 212 to move the lens component 220, which is attached to the interior surface of the top portion 216, in the first direction towards the detector component 250. A corresponding force 272 may be applied underneath the top portion 116 adjacent to a channel portion 224 formed in the housing component 210 in an second direction, which is opposite to the first direction, to provide support to the top portion 116 of the housing component 210 during compression of the top portion 216. As such, in one aspect, this allows for focal adjustment of the lens component 220 in reference to the detector component 250 to thereby provide an adjustable focus range between the lens component 220 and the detector component 250 with directional focusing capability by compression of the focal alignment feature 230 of the housing component 210.

The base component 212 comprises one or more pins or pads 240 that provide electrical access to electrical outputs of the detector component 250. The pins or pads 240 are formed of a conductive material, such as metal.

The detector component 250 comprises, in one embodiment, at least one infrared sensor (e.g., any type of infrared sensor, such as a focal plane array) for capturing infrared image signals representative of IR energy from an object passing through the lens component 220. In one aspect, the infrared sensor of detector 250 provides for representing (e.g., converting) a captured image signal of an image as digital data (e.g., via an analog-to-digital converter included, for example, as part of the detector 250). In another aspect, a processing component (not shown) may be coupled to the detector component 250 via the pins 240 and be adapted to receive infrared image signals from the detector component 250, process infrared image signals (e.g., to provide processed image data), and store infrared image signals or image data in a memory component (not shown).

Referring to FIGS. 2A-2C, the lens package 200 provides for deformation of the top portion 216 of the housing component 210 via the focal alignment feature 230, which allows for focal adjustment of the lens component 220 in one or more directions. In one aspect, the focal adjustment or deformation of the metal housing structure (i.e., housing component 210) may be permanent and substantially reliable. Accordingly, the lens package 200 provides for an adjustable focus range with directional focusing capability by compression.

Figure 3A:
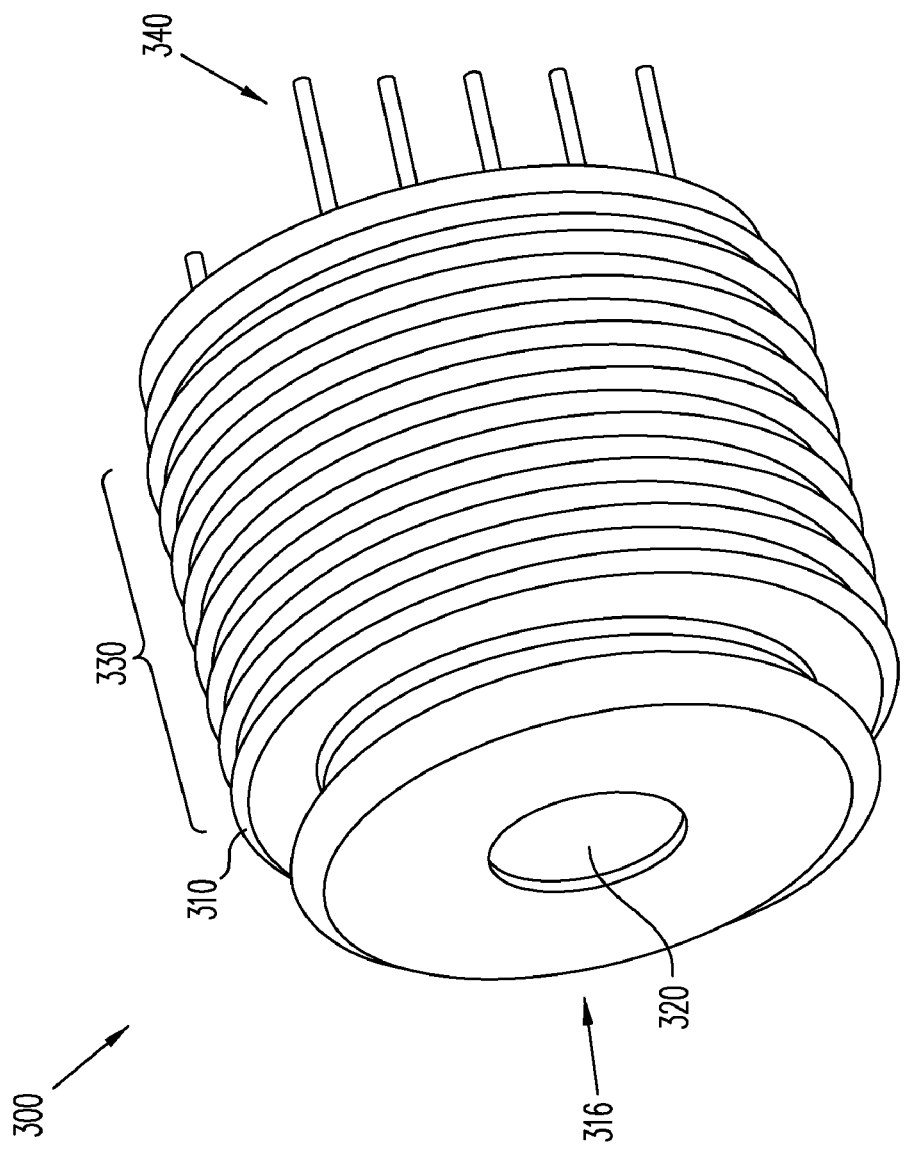
FIGS. 3A-3C show another vacuum package assembly (e.g., lens package) with another focal alignment feature, in accordance with another embodiment of the invention.
Figure 3B:
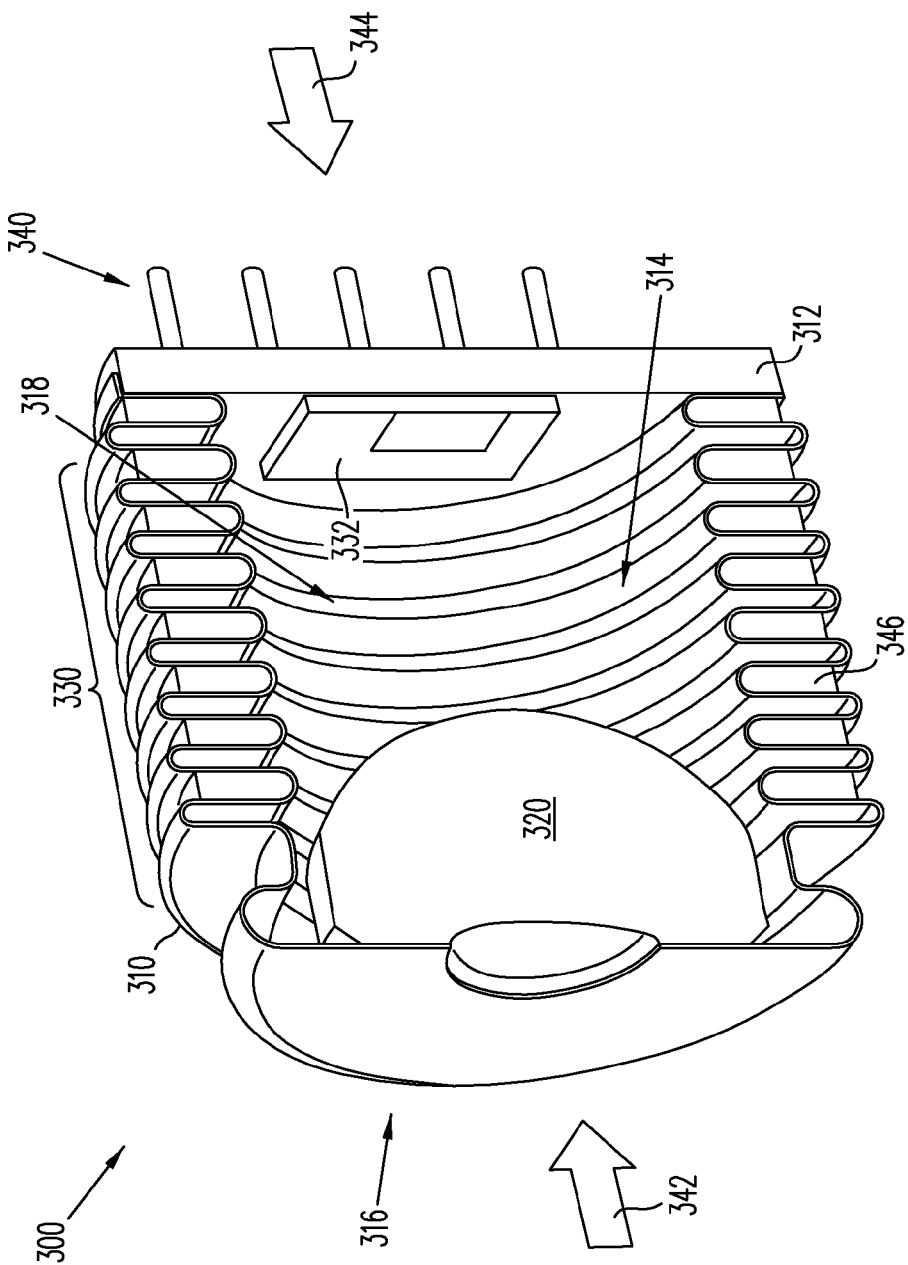
Figure 3C:
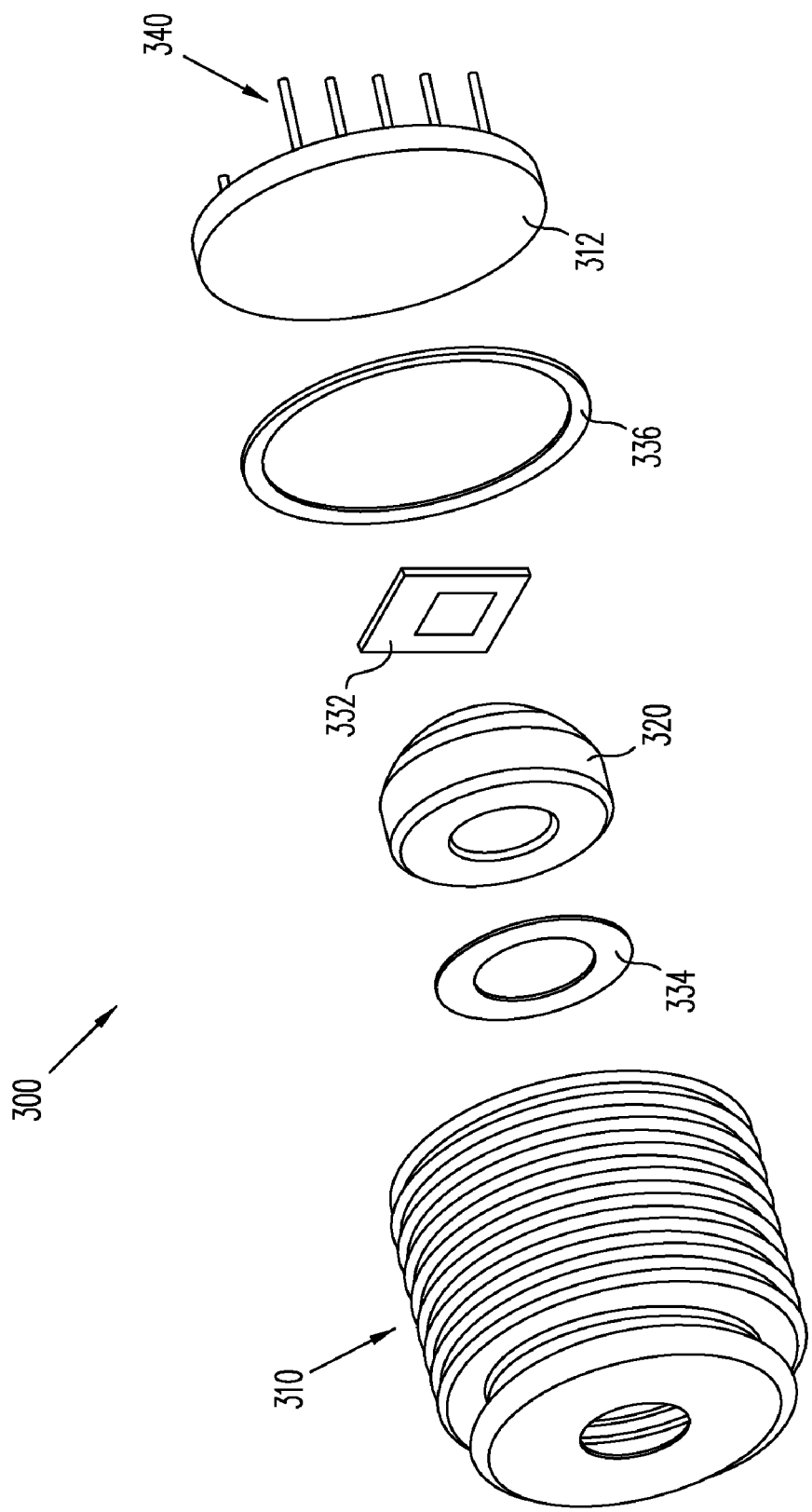

FIGS. 3A-3C show various perspective views of a lens package 300, in accordance with still another embodiment of the invention. In particular, FIG. 3A shows one embodiment of an assembled view of the lens package 300, FIG. 3B shows one embodiment of a cross-sectional view of the lens package 300, and FIG. 3C shows one embodiment of an expanded view of the lens package 300.

The lens package 300, in one embodiment, comprises a housing component 310, a base component 312, a lens component 320, and a detector component 332. The housing component 310 comprises, in one embodiment, a plurality of bellows 330 that are compressible to focally adjust the lens component 320 in reference to the detector component 332. The housing component 310 comprises a metal structure that is adapted to be vacuum compatible with high thermal conductivity. The housing component 310 comprises a cylindrically-shaped structure that defines an interior space 314, which may maintain a vacuum when attached to the base component 312 and lens component 320. As shown in FIG. 3A, the bellows 330 may be formed in the sidewalls of the cylindrically-shaped housing component 310, and the bellows 330 may be referred to as a built-in retaining feature for focusing the lens component 320 in a vacuum. In one aspect, the housing component 310 comprises an interior surface 318, which may be optionally coated with an IR-non-reflective material (e.g., black paint).

The base component 312 comprises, in one embodiment, a circular-shaped disk type structure comprising a ceramic material and/or a metal material. Referring to FIG. 3C, the base component 312 may be attached to the housing component with a solder or adhesive element 336. In one aspect, the base component 312 may be utilized to provide support to the housing component 310 during adjustment of the focal position of the lens component 320, which is described in greater detail herein.

The lens component 320, in one embodiment, comprises a lens element or group of lens elements that are integrated with the housing component 310 and adapted to focus IR energy from an object to the detector component 332 positioned within the interior space 314 of the housing component 310. Referring to FIGS. 3B and 3C, the lens element 320 may be attached to an interior portion of the housing component 310 with a solder or adhesive element 334.

The housing component 310, in one embodiment, comprises the bellows 330 as a compression and/or decompression alignment feature, which allows for focal adjustment of the lens component 320 by applying pressure to (e.g., forcefully compressing) or relieving pressure from (e.g., forcefully decompressing) the bellows 330. In one aspect, the bellows 330 may be referred to as built-in compressible or decompressible spring features for focally adjusting the top portion 316 (i.e., top wall portion) of the housing component 310. For example, as shown in FIG. 3B, a pressure 342 may be applied to the top portion 316 of the housing component 310 in a first direction perpendicular to the base component 312 to move the lens component 320, which is attached to the interior surface of the top portion 316, in the first direction towards the detector component 332. A corresponding pressure 344 may be applied to the base component 312 in a second direction, which is opposite to the first direction, to provide support to the housing component 310 during compression of the top portion 316. As such, in one aspect, this allows for focal adjustment of the lens component 320 in reference to the detector component 332 to thereby provide an adjustable focus range between the lens component 320 and the detector component 332 with directional focusing capability by compression of the focal alignment feature 330 of the housing component 310.

The housing component 310, in one embodiment, may comprise exterior structural features 346 in between the bellows 330 that are molded epoxy and/or plastic for structural protection and thermal insulation from the environment. The housing component, in another embodiment, may include an ultra-violet (UV) cured adhesive coating (not shown) over the exterior structural features 346, which may be applied after focally adjusting the lens component 320.

The base component 312 comprises one or more pins or pads 340 that provide electrical access to electrical outputs of the detector component 332. The pins or pads 340 are formed of a conductive material, such as metal.

The detector component 332 comprises, in one embodiment, at least one infrared sensor (e.g., any type of infrared sensor, such as a focal plane array) for capturing infrared image signals representative of IR energy from an object passing through the lens component 320. In one aspect, the infrared sensor of detector 332 provides for representing (e.g., converting) a captured image signal of an image as digital data (e.g., via an analog-to-digital converter included, for example, as part of the detector 332). In another aspect, a processing component (not shown) may be coupled to the detector component 332 via the pins 340 and may be adapted to receive infrared image signals from the detector component 332. Further, the processing component may be adapted to process infrared image signals (e.g., to provide processed image data) and store infrared image signals and/or image data in a memory component (not shown).

Referring to FIGS. 3A-3C, the lens package 300 provides for deformation of the sidewall bellows 330 of the housing component 310 via compression, which allows for focal adjustment of the lens component 320 in one or more directions. In one aspect, the focal adjustment or deformation of the metal housing structure (i.e., the bellows 330 of the housing component 310) may be permanent and substantially reliable. Accordingly, the lens package 300 provides for an adjustable focus range with directional focusing capability by compression (e.g., applying pressure) or decompression (e.g., relieving pressure).

Figure 3D:
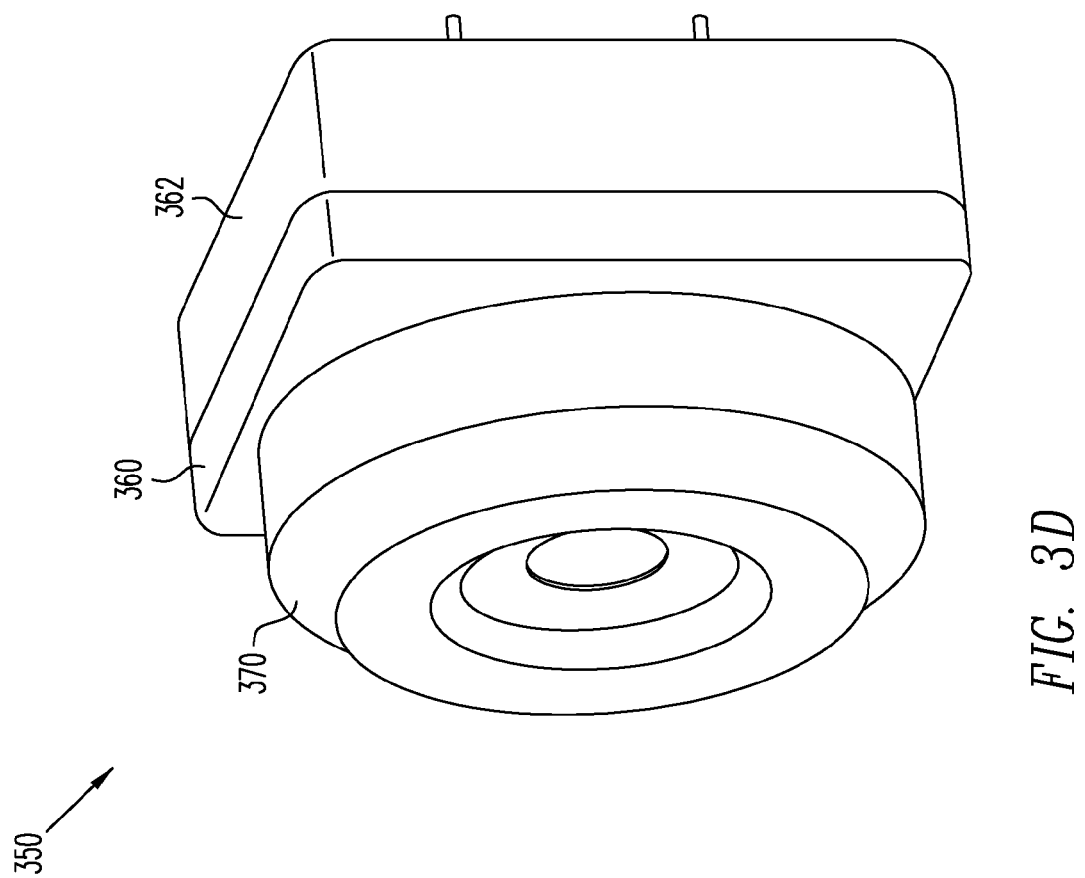
FIGS. 3D-3F show a lens housing for a vacuum package assembly (e.g., lens package) with a focal alignment feature, in accordance with an embodiment of the invention.
Figure 3E:
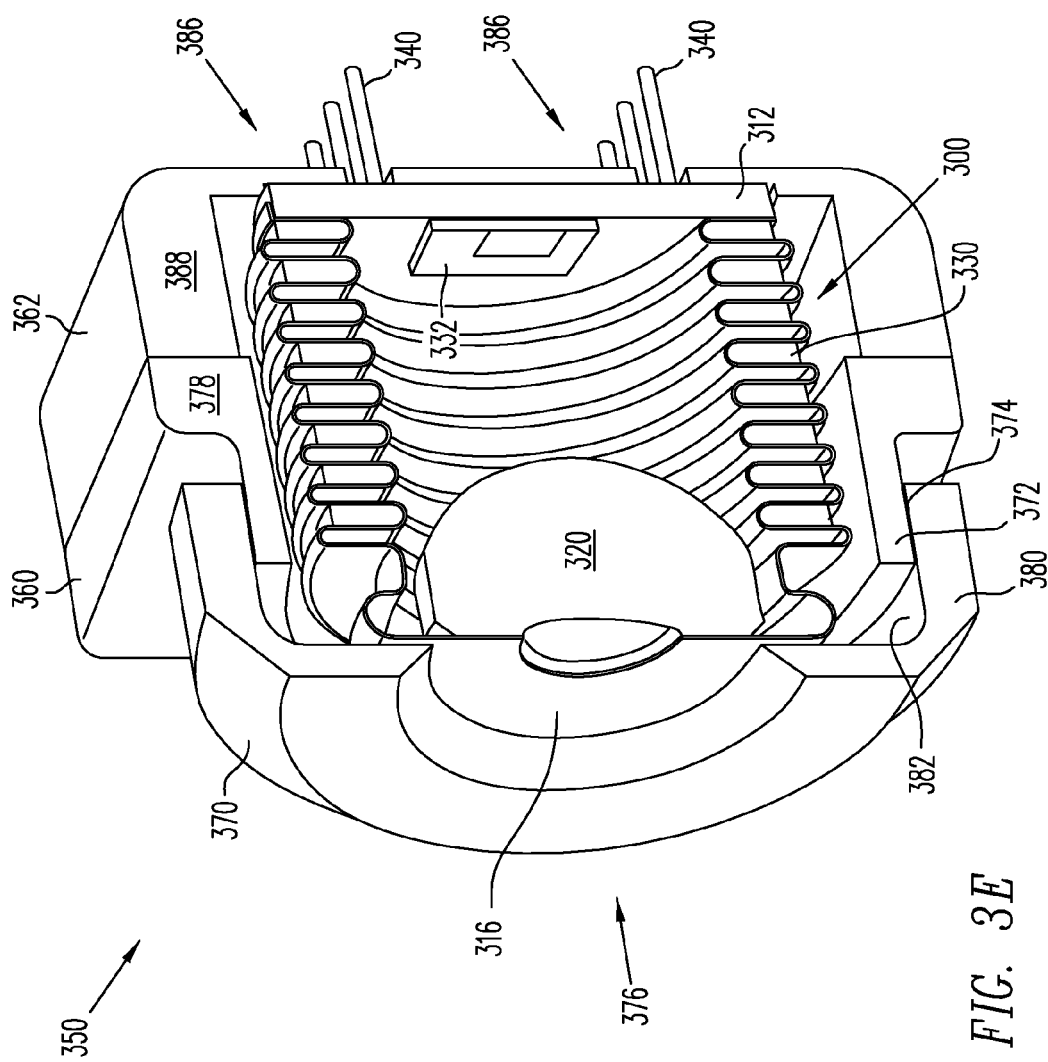
Figure 3F:
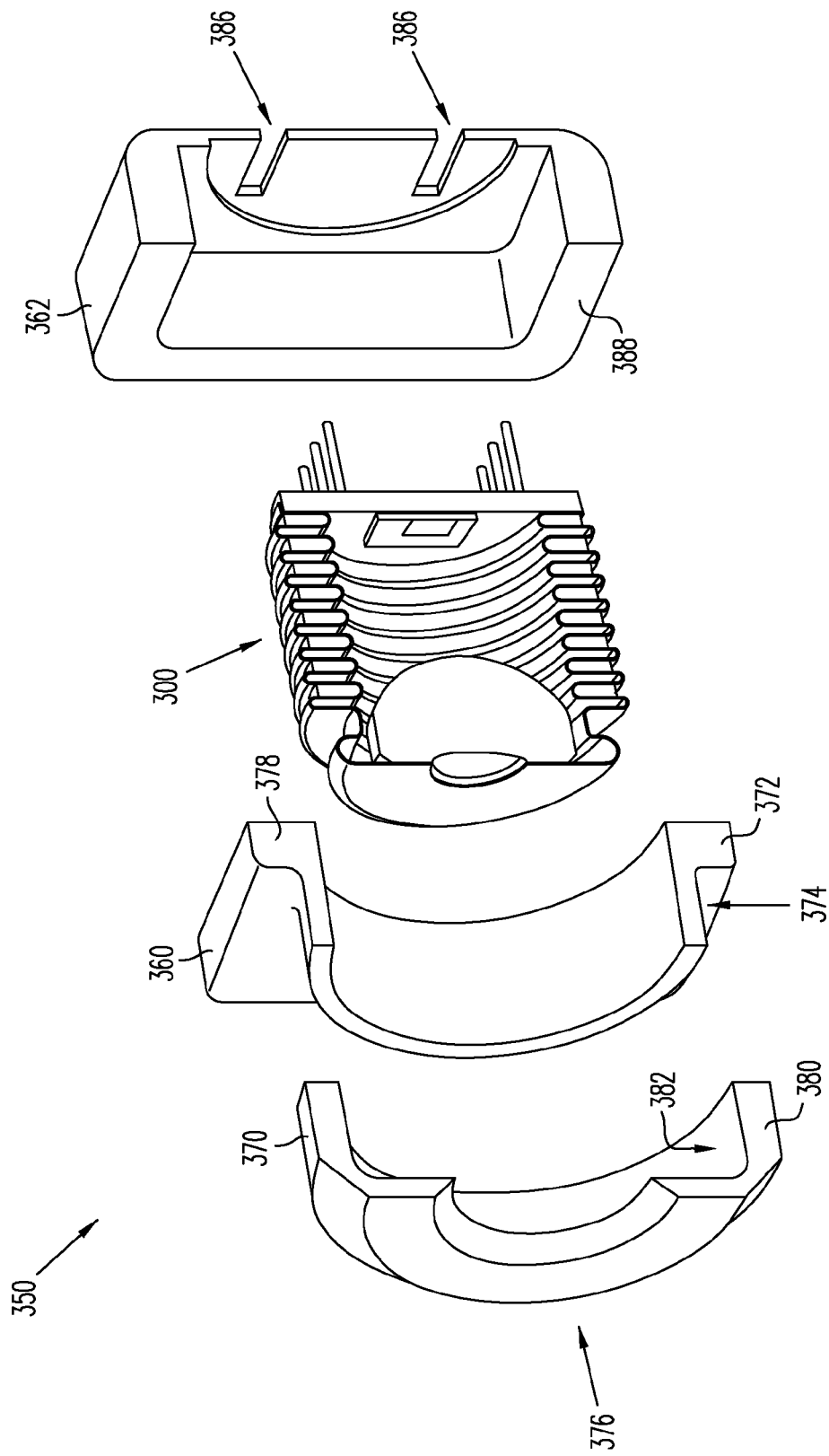

FIGS. 3D-3F show various perspective views of a lens housing 350 for lens package 300, in accordance with still another embodiment of the invention. In particular, FIG. 3D shows one embodiment of an assembled view of the lens housing 350, FIG. 3E shows one embodiment of a cross-sectional view of the lens housing 350 having lens package 300 positioned therein, and FIG. 3F shows one embodiment of an expanded view of the lens housing 350 in reference to lens assembly 300.

The lens housing 350, in one embodiment, comprises a central housing component 360, a base housing component 362, and a lens housing component 370 that are adapted to be assembled to encapsulate and securely retain the lens package 300 therein. As shown in FIGS. 3D-3F, the lens housing 350 comprises an assembly of components 360, 362, 370 with the lens package 300 positioned therein.

The central housing component 360, in one implementation, functions as a housing cover for securing and retaining a housing portion of the lens package 300. The central housing component 360 comprises a mounting region 378 adapted to be mounted to the base housing component 362. The central housing component 360 comprises a recessed portion 372 having an external threaded surface 374 adapted to receive the lens housing component 370, in a manner as described in greater detail herein.

The base housing component 362, in one implementation, functions as a heatsink and also functions as a base cover for securing and retaining a base portion of the lens package 300. The base housing component 362 comprises pin apertures 386 adapted to provide through-holes for the pins 340 of the lens package 300. The base housing component 362 comprises a mounting region 388 adapted to receive the mounting region 378 of the central housing component 360 for secure attachment thereto. In various implementations, the central housing component 360 may be attached to the base housing component 362 with a solder or adhesive element.

The lens housing component 370, in one implementation, functions as a lens cover for securing and retaining a lens portion of the lens package 300. The lens housing component 370, in one embodiment, comprises a lens aperture 376 adapted to receive the top portion 316 of the lens package 300 adjacent the lens component 320. The lens housing component 370 comprises a coupling portion 380 having an internal threaded surface 382 adapted to couple with the external threaded surface 374 of the central housing component 360. In one aspect, when the lens housing component 370 is threaded and rotated onto the central housing component 360, the lens housing component 370 applies a compression force to the top portion 316 of the housing component 310 of the lens package 300 to move the lens component 320 toward the detector component 332 for focal adjustment of the lens component 320.

Accordingly, as shown in FIG. 3E, the lens housing component 370 may be referred to as an integrated compression feature for compressing and focusing the lens component 320, in a manner as described herein. Thus, in one implementation, the lens housing component 370 is adapted to function as a compression ring for compressing the top portion 316 of the housing component 310 of the lens package 300 for focal adjustment of the lens component 320 with respect to the detector component 332. In one aspect, the lens housing component 370 is adapted to maintain the compression force on the top portion 316 of the lens package 300 to maintain focal adjustment of the lens component 320.

Referring to FIGS. 3A-3F, the lens housing 350 is adapted to provide and maintain optical focus of the lens package 300 by compression (e.g., manual or automated) of the elastic structure of the housing component 310 with the integrated mechanical compression feature of the bellows 330. In one aspect, the bellows 330 of the lens package 300 provide a biasing feature to the lens housing 330, wherein the threaded coupling of the central housing component 360 and the lens housing component 370 provides for bi-directional focusing capability of the lens package 300. In another aspect, the lens housing 350 provides for encapsulated protection of the lens package 300.

Figure 4A:
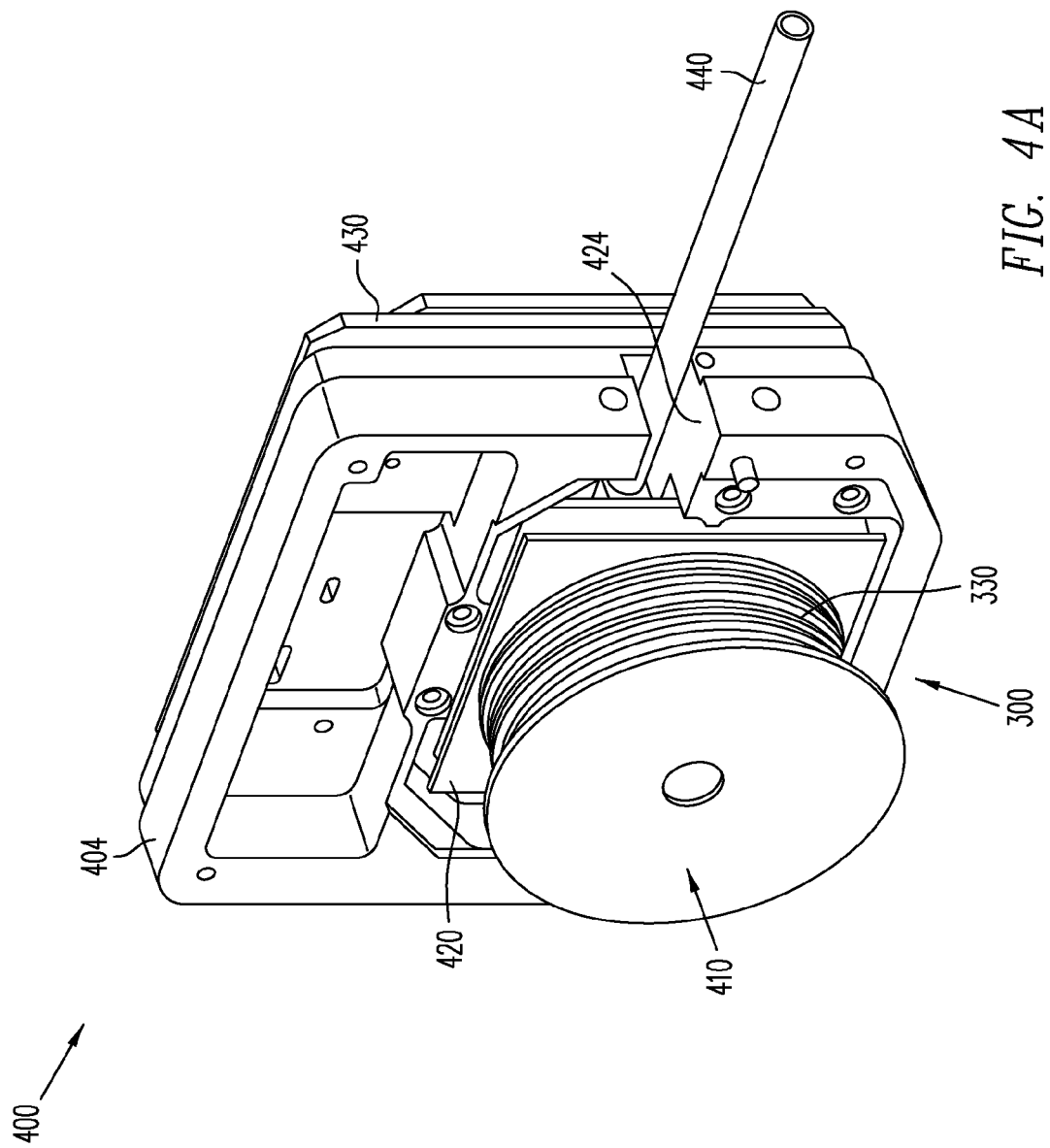
FIGS. 4A-4C show another vacuum package assembly (e.g., lens package) with another focal alignment feature, in accordance with an embodiment of the invention.
Figure 4B:
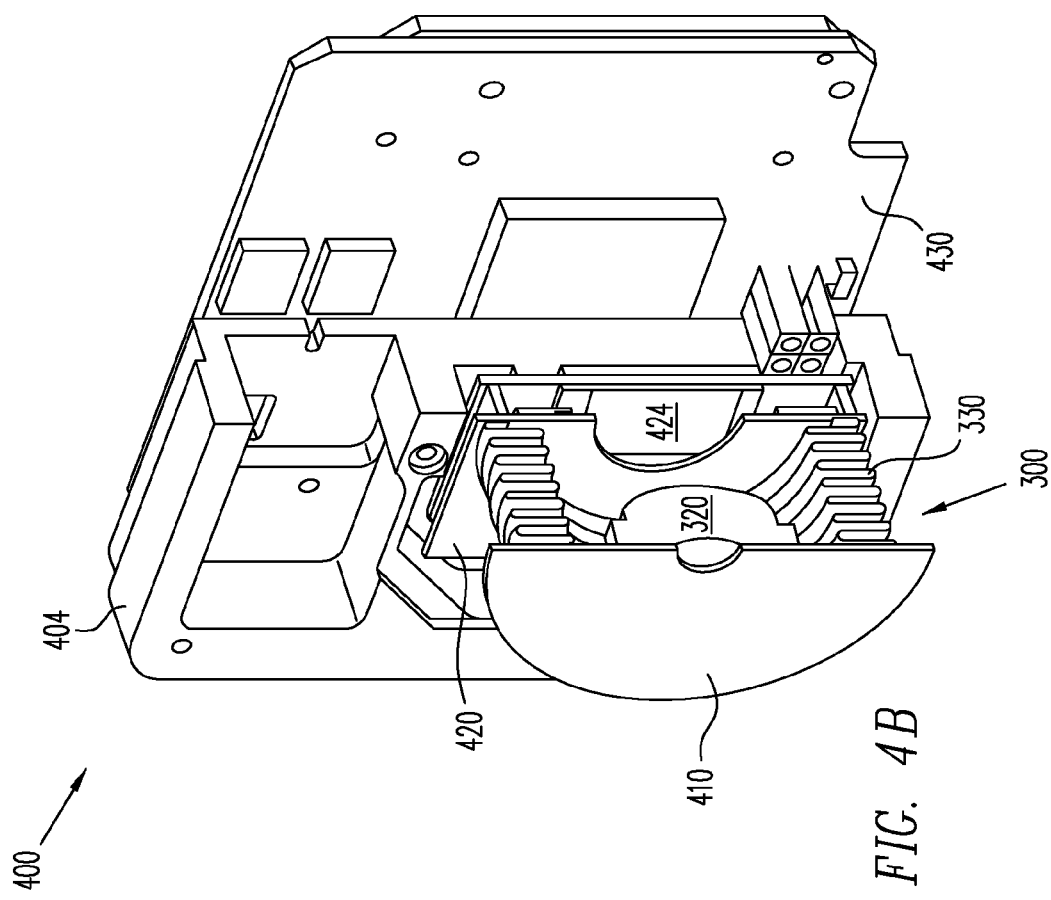
Figure 4C:
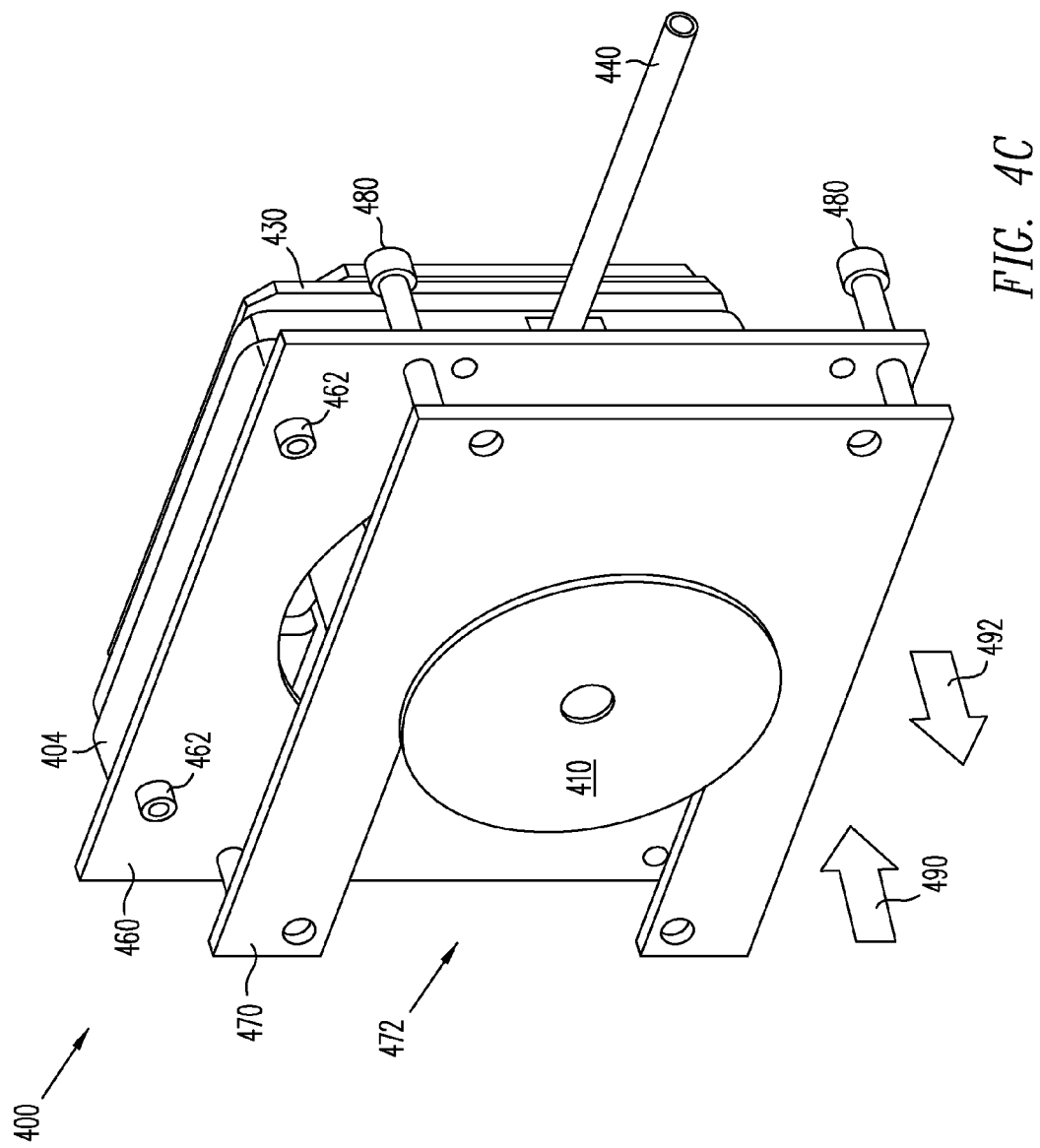

FIGS. 4A-4C show various perspective views of a lens package assembly 400, in accordance with an embodiment of the invention. In particular, FIG. 4A shows one embodiment of an assembled view of the lens package assembly 400, FIG. 4B shows one embodiment of a cross-sectional view of the lens package assembly 400, and FIG. 4C shows one embodiment of compressing the lens package assembly 400.

Referring to FIGS. 4A and 4B, the lens package assembly 400, in one embodiment, comprises a lens assembly (e.g., the lens package 300 of FIGS. 3A-3C having bellows 330), a mounting plate 404, a retaining and aperture plate 410, a vacuum package adapter plate 420, an IR detector 424, an electronics package 430, and a vacuum tube 440, which may be connected to a vacuum pump (not shown) for producing a vacuum within the lens package assembly 400 prior to sealing vacuum tube 440, as would be understood by one skilled in the art. As shown in FIGS. 4A-4B, the retaining and aperture plate 410 (which may alternatively represent the top portion 316 of the lens package 300) is positioned adjacent to the top portion 316 of the lens package 300. Moreover, vacuum package adapter plate 420 may be optional or form part of base component 312 to support detector component 332, as discussed for example in reference to lens package 300 (e.g., in reference to FIG. 3B).

Referring to FIG. 4C, the lens package assembly 400 includes a focus adapter plate 460, an adjusting and focusing plate 470, and a plurality of alignment posts 480. The focus adapter plate 460 is attached to the mounting plate 404 via a plurality of screws 462, and the adjusting and focusing plate 470 is moveably attached to the focus adapter plate 460 via the alignment posts 480. The lens package 300 is securely positioned within lens package assembly 400 relative to the focus adapter plate 460 and the adjusting and focusing plate 470. The adjusting and focusing plate 470 comprises a channel 472 formed in a side portion thereof, which is adapted to receive the top portion 316 of the lens package 300 (or alternatively with the retaining and aperture plate 410) positioned on one side of the adjusting and focusing plate 470 and the remaining portion of lens package 300 positioned on the other side of the retaining and aperture plate 410.

The alignment posts 480 (e.g., screws, bolts, tensioners, or other conventional hardware) are adapted to allow the adjusting and focusing plate 470 to move between a plurality of positions relative to the focus adapter plate 460 to thereby apply pressure to or relieve pressure from the bellows 330 of the lens package 300. In one aspect, applying pressure to the adjusting and focusing plate 470 in a first direction 490 compresses the bellows 330 of the lens package 300 to focally adjust the lens component 320 of the lens package 300 in the first direction 490. In another aspect, relieving pressure to the adjusting and focusing plate 470 in a second direction 492 decompresses the bellows 330 of the lens package 300 to focally adjust the lens component 320 of the lens package 300 in the second direction 492. In some implementations, the pressure applied or relieved may be approximately 14.7 psi, as an example, but may vary over a wide range of values depending on the requirements, materials and application.

Referring to FIGS. 4A-4C, it should be appreciated that a platform (e.g., assembly of the mounting plate 404, retaining and aperture plate 410, and/or vacuum package adapter plate 420) is not strictly intended to be a required component for implementation of the lens assembly (e.g., the lens package 300), but may represent an example embodiment, such as for demonstrating feasibility of the embodiment.

In general in accordance with some embodiment, lens package assembly 400 may be viewed as disclosing techniques for providing focal adjustment of lens component 320 relative to detector component 332, while lens package assembly 400 is within the infrared camera (e.g., the associated infrared camera incorporating lens package assembly 400). This technique, for example, may allow periodic tuning or adjustment of the focal adjustment over the life of the infrared camera.

Furthermore, it should be understood that various techniques and conventional manufacturing techniques may be employed to provide the required compressive and/or decompressive forces required for focal adjustment of the lens package assemblies disclosed herein. For example, the compression tool 190 is disclosed for use with lens package 100 to assist with the focal adjustment process (e.g., in reference to FIG. 1D). However, this is not limiting and various types of tools and housings with focal adjustment features may be implemented in accordance with the principles of the invention. As a further example, the adjusting and focusing plate 470 may represent a tool to assist with the focal adjustment process for lens packages 200 and/or 300 (e.g., as discussed similarly for the compression tool 190 for lens package 100 of FIG. 1D), as would be understood by one skilled in the art.

Figure 5:
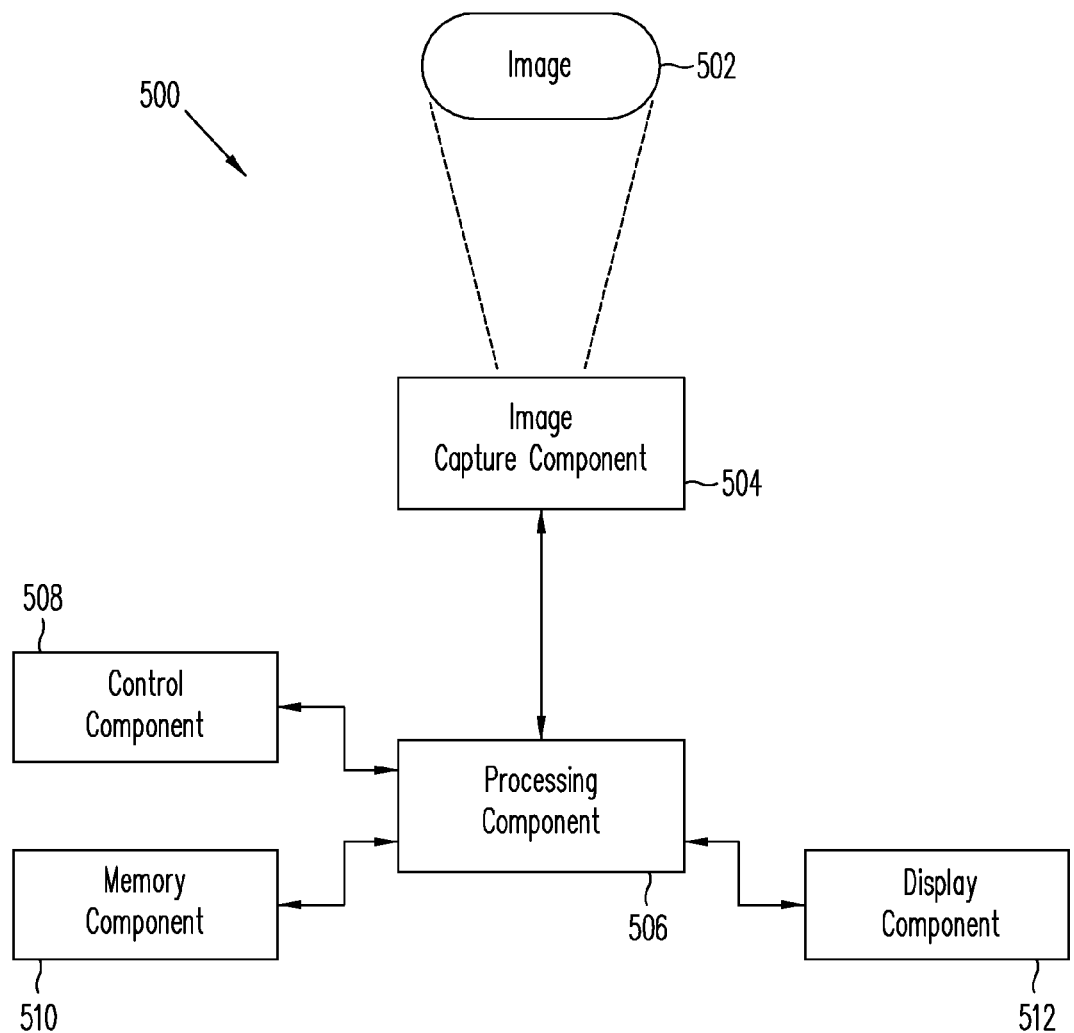
FIG. 5 shows a block diagram of an infrared camera in accordance with one or more embodiments of the invention.

As disclosed herein (e.g., in reference to FIGS. 1A-4C), various types of vacuum package assemblies (also referred to herein as lens packages) are described for implementation within an infrared camera (e.g., any type of infrared imaging system). For example, FIG. 5 illustrates a functional block diagram of an infrared camera 500 that may be implemented as disclosed herein for one or more embodiments. Infrared camera 500 may include an image capture component 504, a processing component 506, a control component 508, a memory component 510, and a display component 512.

Image capture component 504 may include a vacuum package assembly as discussed herein (e.g., lens package 100, 200, or 300) for receiving infrared energy from an object 502 and capturing image data to provide for storage and/or display. Image capture component 504 may be controlled by a processing component 506 (e.g., processor, logic circuit, microcontroller, or other type of control device). For example, processing component 506 may utilize a memory component 510 (e.g., any type of memory) for storing control instructions, image data from image capture component 504, calibration data, or other information. Processing component 506 may receive user commands from a control component 508 (e.g., an input device, which may include switches, a touch screen, keyboard, or other type of input device) and may display the image data captured by image capture component 504 on a display component 512 (e.g., any type of display, such that a user may view the object or other image (scene) information captured by image capture component 504).

Infrared camera 500 may be a portable, self contained device (e.g., portable infrared camera with a battery) or may represent a networked system, with one or more of the components remote from each other and in communication via a wired or wireless network. For example, control component 508 and display component 512 may be at a user's workstation and in communication remotely with image capture component 504.

Where applicable, various embodiments of the invention may be implemented using hardware, software, or various combinations of hardware and software. Where applicable, various hardware components and/or software components set forth herein may be combined into composite components comprising software, hardware, and/or both without departing from the scope and functionality of the invention. Where applicable, various hardware components and/or software components set forth herein may be separated into subcomponents having software, hardware, and/or both without departing from the scope and functionality of the invention. Where applicable, it is contemplated that software components may be implemented as hardware components and vice-versa.

Software, in accordance with the invention, such as program code and/or data, may be stored on one or more computer readable mediums. It is also contemplated that software identified herein may be implemented using one or more general purpose or specific purpose computers and/or computer systems, networked and/or otherwise. Where applicable, ordering of various steps described herein may be changed, combined into composite steps, and/or separated into sub-steps to provide features described herein.

Embodiments described herein illustrate but do not limit the invention. It should also be understood that numerous modifications and variations are possible in accordance with the principles of the invention. For example, although various embodiments may be shown as having a particular shape, it should be understood that these shapes are not limiting and may be varied depending on a desired application or specific implementation requirements. For example, a housing may be shown as circular, but may be also implemented in various other shapes, such as square, oval, hexagonal, or any other desired shape. Accordingly, the scope of the invention is defined only by the following claims.

What is claimed is:

1. A vacuum package assembly comprising:
   a housing component;
   a base component coupled to the housing component;
   a lens component coupled to the housing component; and
   an infrared detector component, coupled within the housing component, adapted to receive infrared energy passing through the lens component,
   wherein the housing component comprises a focal alignment feature that allows a focal adjustment of the lens component relative to the infrared detector component by applying pressure to at least a portion of the housing component.

2. The vacuum package assembly of claim 1, wherein the housing component comprises a cylindrically-shaped metal structure that is adapted to define a vacuum compatible interior space, and wherein the housing component, the base component, and the lens component are adapted to maintain a vacuum within the vacuum package assembly.

3. The vacuum package assembly of claim 1, wherein the base component comprises a circular-shaped disk type structure comprising a ceramic material and/or a metal material, and wherein the base component is coupled to the housing component with a first solder element and/or a first adhesive element.

4. The vacuum package assembly of claim 1, wherein the lens component comprises a lens element or a group of lens elements that are integrated with the housing component and adapted to focus infrared energy from an object to form an image at the infrared detector component, positioned within the housing component and adapted to provide an infrared image signal, and wherein the lens element is coupled to an interior portion of the housing component with a second solder element and/or a second adhesive element.

5. The vacuum package assembly of claim 1, wherein the base component comprises one or more pins or pads that provide electrical access to electrical outputs of the infrared detector component, and wherein the pins or pads are formed of a conductive material.

6. The vacuum package assembly of claim 1, wherein the infrared detector component comprises at least one infrared sensor for providing infrared image signals to form an image representative of infrared energy passing through the lens component from an object, wherein the vacuum package assembly is incorporated into an infrared camera having a display for viewing the image.

7. The vacuum package assembly of claim 1, wherein the focal alignment feature allows for deformation of the housing structure to thereby provide for focal adjustment of the lens component in at least one direction.

8. The vacuum package assembly of claim 1, wherein focal adjustment of the lens component provides an adjustable focus range between the lens component and the infrared detector component with directional focusing capability by compression or decompression of the focal alignment feature.

9. The vacuum package assembly of claim 1, wherein the housing component comprises a top portion having the focal alignment feature that allows focal adjustment of the lens component by applying pressure to the top portion, and wherein a compression force is applied to the top portion of the housing component in a first direction to move the lens component, which is coupled to an interior surface of the top portion, in the first direction towards the infrared detector component.

10. The vacuum package assembly of claim 1, wherein the housing component comprises a top portion having the focal alignment feature formed around a circumference of the top portion, and wherein the focal alignment feature allows focal adjustment of the lens component by applying pressure to at least an outer edge of the top portion, and wherein a compression force is applied to the top portion of the housing component in a first direction toward the base component to move the lens component, which is coupled to an interior surface of the top portion, in the first direction toward the infrared detector component.

11. The vacuum package assembly of claim 1, wherein the focal alignment feature comprises a plurality of bellows as a compression or decompression alignment feature to allow for focal adjustment of the lens component by applying pressure to the plurality of bellows or relieving pressure from the plurality of bellows, respectively.

12. The vacuum package assembly of claim 11, wherein the bellows are adapted to provide integrated compressible or decompressible spring features positioned on a side portion of the housing component for focally adjusting the lens component, which is coupled to an interior surface of top portion of the housing component.

13. The vacuum package assembly of claim 11, wherein a compression pressure is applied to a top portion of the housing component in a first direction to compress the bellows and move the lens component in the first direction towards the infrared detector component.

14. The vacuum package assembly of claim 13, wherein a decompression pressure is applied to a top portion of the housing component in a second direction, opposite to the first direction, to decompress the bellows and move the lens component in the second direction away from the infrared detector component.

15. The vacuum package assembly of claim 1, further comprising an encapsulation component adapted to encapsulate the vacuum package assembly.

16. The vacuum package assembly of claim 15, wherein the encapsulation component comprises a rotatable component adapted to apply pressure to at least a portion of the housing component for focal adjustment of the lens component relative to the infrared detector component.

17. A method comprising:
providing a housing component adapted to provide a vacuum compatible interior space;
coupling a lens component to the housing component;
providing an infrared detector component within the housing component;
coupling a base component to the housing component, wherein the housing component, the lens component, and the base component are adapted to form a vacuum package assembly; and
applying pressure to a portion of the housing component to focally adjust the lens component in reference to the infrared detector component.

18. The method of claim 17, wherein the housing component comprises a plurality of bellows in a sidewall of the housing component to allow for focal adjustment of the lens component by applying pressure to the plurality of bellows or relieving pressure from the plurality of bellows.

19. The method of claim 18, wherein the bellows are adapted to form integrated compressible or decompressible spring features formed as part of the housing component for focally adjusting the lens component, which is coupled to an interior surface of a top portion of the housing component.

20. The method of claim 18, wherein the pressure comprises a compression pressure that is applied to a top portion of the housing component in a first direction to compress the bellows and move the lens component, which is coupled to an interior surface of the top portion, in the first direction towards the infrared detector component.

21. The method of claim 18, wherein the pressure comprises a decompression pressure that is applied to a top portion of the housing component in a second direction to decompress the bellows and move the lens component, which is coupled to an interior surface of the top portion, in the second direction away from the infrared detector component.

22. The method of claim 17, further comprising creating a vacuum within the vacuum package assembly.

23. The method of claim 17, further comprising capturing infrared images with the infrared detector component, wherein the infrared detector component is adapted to receive infrared energy passing through the lens component from an image.

24. An infrared imaging system comprising:
means for providing a vacuum compatible interior space having a focal alignment feature, wherein the providing means includes a first end and a second end;
means for sealing the first end, wherein the sealing means focuses infrared energy towards an infrared detector within the providing means, and wherein the focal alignment feature is configured to allow a focal adjustment of the sealing means for the first end relative to the infrared detector in response to pressure applied to the providing means; and means for sealing the second end, wherein the providing means, the sealing means for the first end, and the sealing means for the second end form a vacuum package assembly.

25. The infrared imaging system of claim 24, further comprising means for applying pressure to at least a portion of the providing means to focally adjust the sealing means for the first end in reference to the infrared detector.

* * * * *